Sept. 18, 1951 J. S. HALL 2,568,496
VELOCITY TRIP FOR AUTOMATIC PHONOGRAPHS
Filed Feb. 14, 1947 2 Sheets-Sheet 1
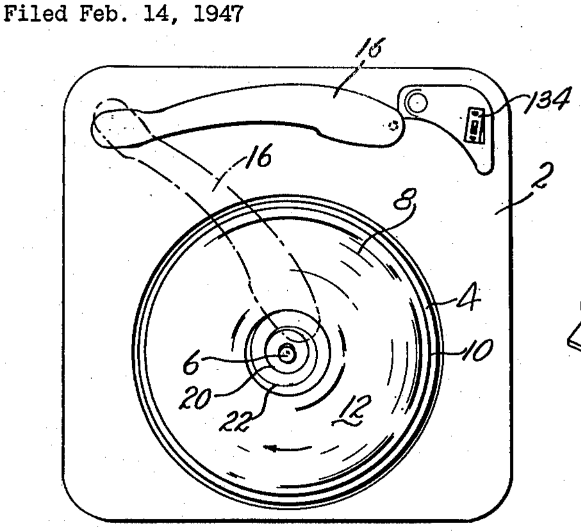
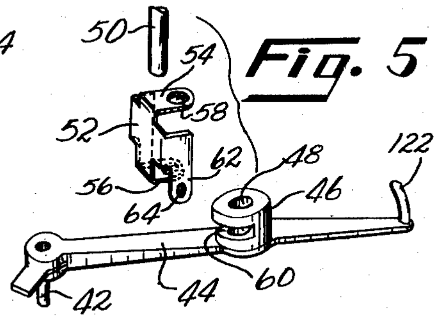
FIG. 5
FIG. 1
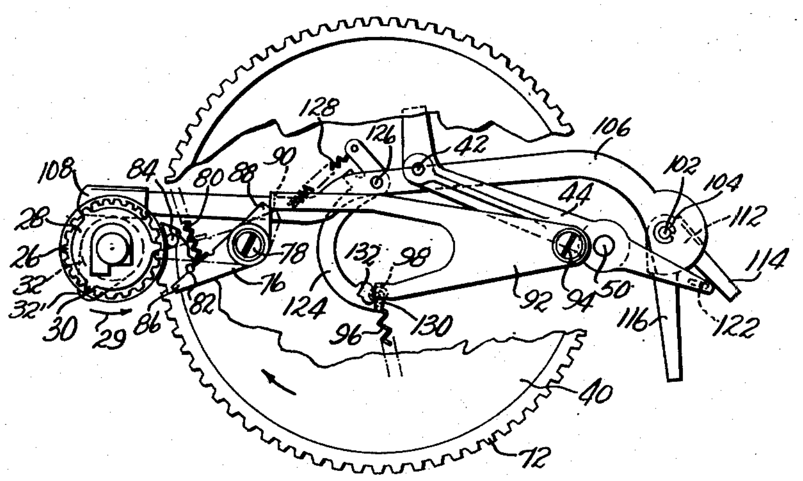
FIG. 4
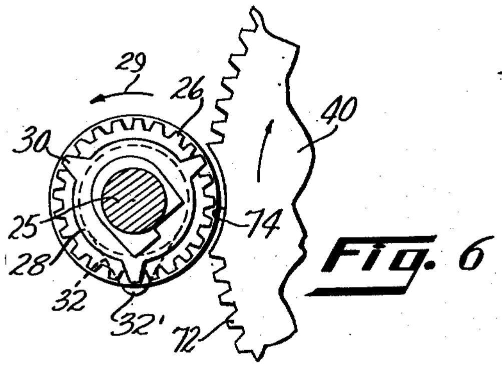
FIG. 6
INVENTOR
JOHN S. HALL
BY James & Franklin
ATTORNEYS INVENTOR
JOHN S. HALL
James & Franklin
ATTORNEYS Patented Sept. 18, 1951 2,568,496

UNITED STATES PATENT OFFICE 2,568,496

VELOCITY TRIP FOR AUTOMATIC PHONOGRAPHS

John S. Hall, Cranford, N. J., assignor to General Instrument Corporation, Elizabeth, N. J., a corporation of New Jersey Application February 14, 1947, Serial No. 728,674

9 Claims. (Cl. 274—10)

The present invention relates to a mechanism for initiating a record changing sequence in an automatic phonograph, said mechanism being responsive to an abnormally rapid inward movement of the tone arm to effect said initiation. Such a mechanism is known as a velocity trip.

Records such as are used with automatic phonographs are, insofar as the final or terminal grooves of their playing surface are concerned, classifiable into two general groups. In one of these groups the final or terminal groove is eccentrically positioned with respect to the record center and in the other of these groups the final or terminal groove is concentric with the record center but considerably inwardly positioned with respect to the next preceding concentric groove, the groove connecting the two having a pitch which is considerably greater than the pitch of the normal reproducing grooves. Thus when either of these two types of records are played, the tone arm, whose inward motion over the record is caused to conform to the grooves thereon by reason of the engagement with those grooves of a stylus attached to the tone arm, is caused to move inwardly at a more rapid rate when the record is finished than is the case during normal reproduction.

Mechanism for initiating the record changing sequence may be classified into three groups: Position trips, eccentric trips and velocity trips. The position trip is actuated when the tone arm has moved inwardly a predetermined amount. However, since all records do not have their terminal grooves equally spaced from the center of the record, this type of trip is unsatisfactory because for some records it will never trip and for other records it will trip before the entire record has been played. The eccentric trip is actuated by the reciprocating motion of the tone arm caused by the eccentricity of the terminal groove. However, since many records in common use do not terminate in an eccentric groove, the eccentric trip is undersirable because it will not function with such records. Record changers are therefore commonly designed with both position and eccentric trips, which are properly structurally related to the tripped apparatus. The velocity trip on the other hand will by itself work with all records and by its nature will not function until the entire record has been played no matter at what point on the record surface that termination occurs. Consequently, the velocity trip is from a theoretical point of view the most desirable of the available mechanisms.

While velocity trips have been employed in the past, their proper functioning has required a relatively complicated arrangement of parts. In addition, in most prior art devices of this nature the rapid inward motion of the tone arm which actuates the trip has not positively performed its function and has on the contrary merely served to release the actual initiating mechanism for the record changing cycle. This has made for uncertainty of operation and in addition for slowness of response.

It is the object of the present invention to provide a velocity trip structure employing a minimum of parts, easily assemblable, and adaptable for use with conventional record changing initiating and control mechanisms, said velocity trip mechanism being so arranged as to positively actuate the initiating mechanism upon an abnormal rapid inward movement of the tone arm.

The present invention relates to the velocity trip mechanism as defined in the appended claims and as set forth in this specification, taken together with the accompanying drawings, in which:

Fig. 1 is a top view of a simplified phonograph embodying the present invention, the record supporting and changing mechanism not being shown since it forms no part of the present invention;

Fig. 4 is a partial schematic view showing the position the elements of the mechanism assume immediately after the tone arm has moved rapidly inward;

Fig. 5 is an exploded perspective view of a portion of the tone arm moving mechanism; and Fig. 6 is a detailed view of a portion of the cam wheel and the rotating means therefor.

Figure 2:
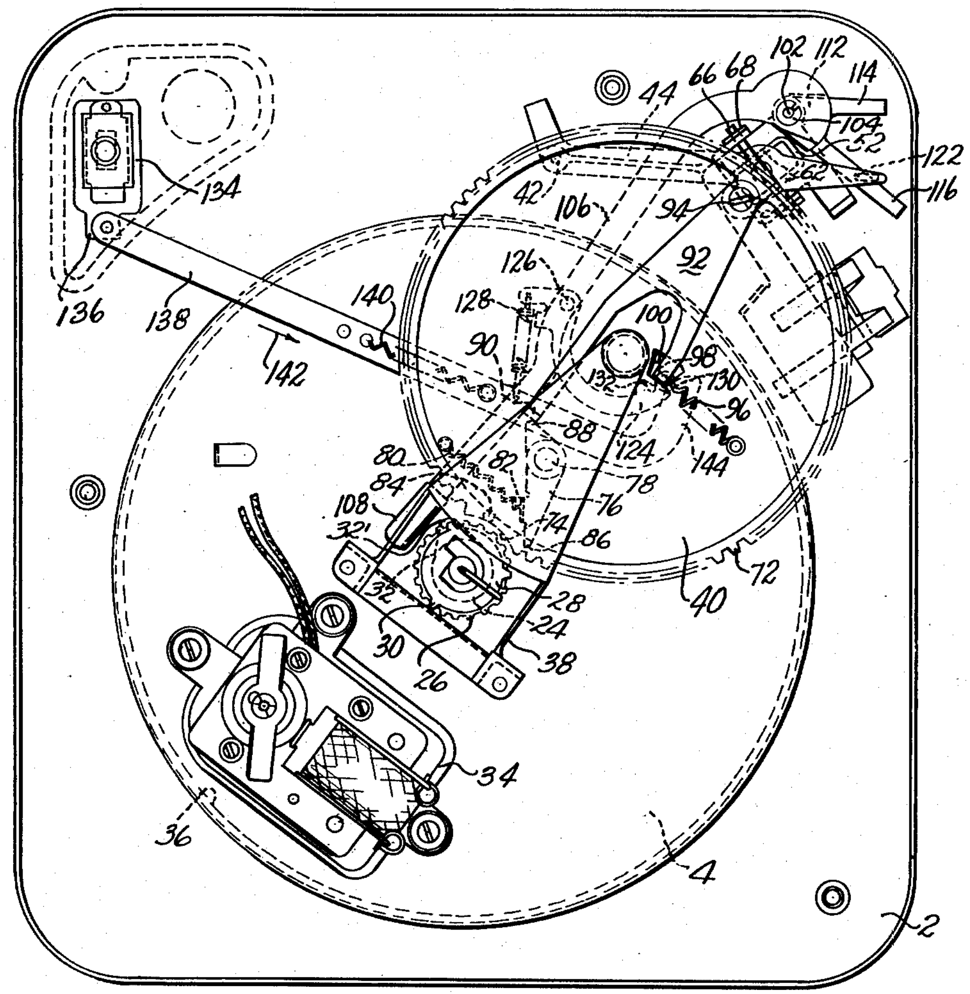
Fig. 2 is a bottom view on an enlarged scale.

The phonograph here illustrated is one which, except for the details of the trip mechanism, is substantially the same as that illustrated and described in the co-pending application of Berne N. Fisher, Serial No. 686,313, filed July 26, 1946, and entitled "Record Changer Phonograph." Since the details of phonograph construction except insofar as specifically here set forth form no part of the present invention, they will not be redescribed here, it being understood that the trip mechanism here disclosed could be embodied in phonographs of many and varied designs. In particular, for sake of simplicity, the peripheral record supporting mechanism is not shown and the record dropping mechanism incorporated in the spindle of the phonograph will merely be referred to in passing, the structures of these mechanisms being well known and part of the prior art.

The phonograph may therefore be considered as comprising a frame 2 upon which a turntable 4 is mounted so as to be rotatable about a spindle 6 for receiving a record 8 and for rotating the same. The upper surface of the record is provided with a continuous spiral groove of fine pitch commencing at 10 and continuing inwardly throughout the area designated 12. The area 12 may be considered as the playing area and when a stylus 14 depending from a tone arm 16 cooperates with those grooves and is guided by them, the pick-up mechanism 18 mounted in the tone arm 16 will in familiar fashion transform to sound the undulations in the grooves in the area 12.

When the sound grooves terminate, the spiral groove in the form here illustrated leads from the last of the reproducing grooves in the area 12 to a terminal groove 20 via a spiral groove 22 the pitch of which is considerably coarser than the relatively fine spiral in the area 12. Consequently, the tone arm as it moves in conformance with the grooves on the record surface will, when reproduction has been terminated, be moved rapidly inward. It will be understood that if the terminal groove 20 is of the eccentric type, its eccentricity will be greater than the normal pitch of the spiral in the area 12 and consequently the same rapid inward motion will be imparted to the tone arm 16.

The turntable fits loosely over the spindle 6 and is provided with a hub portion 24 depending therefrom and rotatably supported on bearing 25. The lower part of the hub portion is provided with a first gear 26 continuous about its periphery and a second gear 28 preferably mounted directly below and rotatable simultaneously with the first gear 26. The second gear 28 is preferably provided with but a few widely spaced gear teeth 30, here illustrated as but three in number. An upper part of the hub portion 24 is provided with a cam portion 32 (best shown in Fig. 6) also simultaneously rotatable therewith.

A motor 34 is fastened to the underside of the frame 2 and, by means of a suitable frictional driving wheel active upon the depending flange 36 of the turntable 4, rotates the same, thus simultaneously rotating the hub 24, the gears 26 and 28 and the cam 32.

Rotatably mounted on bracket 38 is a cam wheel 40, the upper surface of which is preferably provided with a three-dimensional cammed surface so shaped as to control the motion of the tone arm 16 during a record changing sequence. As the cam wheel 40 rotates, a cam follower 42 in contact with said upper surface is moved thereby, thus moving the lift and sweep lever 44 rigidly connected to it. The lever 44 is provided with a hub 46 which receives via its central bore 48 the shaft 50 which, being connected to the tone arm 16, controls the motion of the tone arm and is controlled thereby. A set screw (not shown) fixes the shaft 50 within the bore 48. A bracket 52 is provided with parallel top and bottom arms 54 and 56, each of said arms being provided with an aperture 58 through which the shaft 50 may pass. The lower arm 56 is positionable within slot 60 in the hub 46. The bracket 52 is also provided with depending parallel arms 62 each provided at their extremities with apertures 64 through which a supporting pin 66 may pass, the extremities of the pin 66 being supported from the frame 2 by means of brackets 68. C-washers 70 are receivable in the extremities of shaft 66 to retain it within the bracket 68.

It will be apparent by means of this mounting that any motion imparted to the cam follower 42 by the upper three-dimensional cam surface of the cam wheel 40, whether that motion be radial with respect to the cam wheel or parallel to its axis of rotation, will be transmitted to the tone arm 16. If the cam follower 42 is swung in a radial direction from its position in Fig. 4 to its position in Fig. 2, the lift and sweep lever 44 will be rotated about the vertical axis defined by the shaft 50 and will, by means of the set screw (not shown) rotate the shaft 50 and thus swing the tone arm 16, for example, from its terminal position illustrated in broken lines in Fig. 1 to its record changing position there illustrated in solid lines, thus clearing the turntable so as to permit the placing of a new record thereupon. If the cam follower 42 is lifted in a direction of the axis of the cam wheel 40, the lever 44 along with the bracket 52 will be tilted about the axis of the pin 66 and thus the tone arm 16 will be raised so that its stylus 14 is disengaged from the grooves on the record surface, thus permitting the tone arm 16 to be swung out to its record changing position as heretofore described.

Motion is imparted to the cam follower 42 by rotation of the cam wheel 40, this rotation being accomplished in a manner well known in the art. The outer surface of the cam wheel 40 is provided with a gear 72 of the same pitch as and on the same level as the first gear 26. The gear 72 is provided with a mutilated portion 74, best shown in Fig. 6, and when this mutilated portion 74 is in registration with the gear 26, as is the case during normal reproduction of the record, the gear 26 rotates freely out of engagement with the gear 72. However, the two gears are so arranged that if rotation is imparted to the cam wheel 40, the unmutilated portion of the gear 72 will be brought into engagement with the gear 26 so that the latter can then rotate the cam wheel 40 through one complete revolution, thus controlling the record changing sequence. When that revolution is completed and the mutilated portion 74 is once more brought opposite the gear 26, the gears 26 and 72 become disengaged and the cam wheel 40 becomes stationary.

In order to give the cam wheel 40 the initial rotation necessary to engage the gear 26 with the gear 72, an initiating mechanism is employed comprising the finger 76 mounted on the underside of the cam wheel 40 so as to be pivotable about stud 78. A spring 80 one end of which is fastened to depending lug 82 on the finger 76 urges the finger 76 into engagement with stop 84 in which position the tip 86 of the finger 76 projects outwardly into engagement with one of the gear teeth 30 on the second gear 28. When the finger 76 is in this position, as the turntable 4 rotates, the second gear 28 is rotated in the direction of arrow 29 to cause one of its teeth 30 to engage with the tip 86 of the finger 76 and force the finger against the stop 84 and thus rotate the cam wheel 40 an amount sufficient to engage the gears 26 and 72.

The finger 76 is normally held out of its spring urged position just described by engagement of its inner extremity 88 with the extremity 90 of a latch means 92 also mounted on the underside of the cam wheel 40 so as to pivot about stud 94. A spring 96, one end of which is attached to the latch means 92, tends to hold said means 92 in the position in which it retains the initiating finger 76 in non-projecting position as illustrated in Fig. 2.

The latch means 92 is provided with an extension 98 projecting upward through a suitable aperture 100 in the cam surface of the cam wheel 40.

The record changing cycle initiating and controlling mechanism thus far described is substantially that shown and described in the aforementioned co-pending application. The velocity trip mechanism sensitive to abnormal rapid inward movement of the tone arm to actuate said initiating mechanism and thus control the commencement of the record changing sequence will now be described.

A shaft 102 depends from the frame 2. Mounted for free rotation on said shaft and retained thereon by means of C-washer 104 is the cammed member 106 here shown in the form of a long arm the free extremity of which is adapted to be brought into engagement with the cam 32 and which may be provided at that extremity with a bumper 108 of rubber, polythene or any other suitable shock absorbing material, the bumper 108 being secured thereto by means of rivets 110. Also freely rotatable on shaft 102 and mounted above the cammed member 106 is a forked member 112 provided with forked arms 114 and 116. A friction washer 118 is secured therebetween and a spring 120 mounted on the shaft 102 is provided to ensure frictional contact between the forked member 112 and the cammed member 106 so that rotation of the former will under normal conditions cause the latter to rotate but, because of the frictional connection, it is possible for the latter to be moved against the action of the former.

The lift and sweep lever 44 is provided at its extremity opposite from that bearing the cam follower 42 with an upwardly extending finger 122, said finger being received between the forked arms 114 and 116 of the forked member 112. As the tone arm 16 moves inwardly over the record 8, guided in that motion by engagement of the stylus 14 with the record grooves, the shaft 50 is correspondingly rotated and consequently the lift and sweep lever 44 and the finger 122 thereon are also moved. During the first portion of the reproducing cycle, the finger 122 moves freely between the arms 114 and 116 from a position in contact with the arm 116 (see Fig. 2), but as the tone arm is moved inwardly the finger 122 approaches and eventually makes contact with the arm 114, thus rotating the forked member 112 and, via the frictional connection, the cammed member 106 in such a direction as to bring the bumper 108 into contact with the cam 32. The following sequence of motions then occurs as the turntable rotates: The projection 32′ on the cam 32 (see Fig. 6), when opposite the bumper 108, positively limits the inward motion of the cammed member 106. The turntable continues to rotate and the projection 32′ is moved away from the bumper 108. The tone arm 16, as it follows the spiral in the record 8, is moved inwardly, thus frictionally urging the cammed member 106 inwardly, the latter being moved inwardly in response to said urging. As the turntable completes its revolution the projection 32′ is brought once again into contact with the bumper 108, camming the cammed member 106 outwardly against the urging of the forked member 112, the frictional connection being appropriately slipped. This slight reciprocal motion of the cammed member 106 continues until the tone arm is moved inward more rapidly, as when the stylus 14 contacts the spiral groove 22 of increased pitch. During this period, the cammed member 106 between successive engagements with the cam 32 is moved inwardly an amount considerably greater than in the case of normal reproduction. Then, as the turntable 4 and the cam 32 continue to rotate, the cam 32 moves the cammed member 106 back in the opposite direction.

Figure 3:
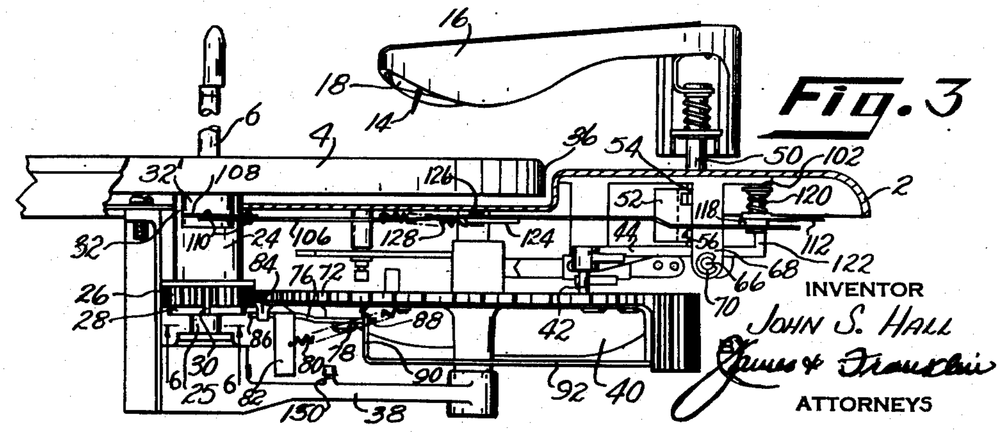
Fig. 3 is a side view of a portion thereof, some of the parts being broken away.

A tripping means, here illustrated as a curved lever 124, is pivotally mounted on the cammed lever 106 so as to rotate about pin 126 and spring 128 urges it to rotate in a counter-clockwise direction as viewed in Figs. 3 and 4. The lever 124 is provided with a surface 130 which is adapted to bear against the side of the upwardly projecting extremity 98 of the latch means 22, urged thereagainst by the spring 128, so as to slide ineffectually back and forth across said extremity 98 when the cammed member 106 is reciprocated a small amount back and forth during normal reproduction of the record 8.

The surface 130 inwardly terminates in shoulder 132 so positioned that when the cammed member 106 moves inwardly a considerable distance, as when the tone arm reaches the groove 22 of increased pitch, the surface 130 will be slid past the extremity 98 of the latch means 92 and the tripping means 124 will then be moved by the spring 128 so that the shoulder 132 engages behind the extremity 98. This condition is illustrated in Fig. 4. When the cam 32 next engages the bumper 108 to move the cammed member 106 out, the tripping means 124 will be moved along with the cammed member 106 and, by engagement of the shoulder 132 with the extremity 98, the latch means 92 will be positively moved in the same direction, thus releasing the initiating finger 76 into engagement with the second gear 28, and initiating the record changing sequence.

In order to provide for manual actuation of the record changing initiating mechanism, the switch 134 which controls the operation of the motor 34 is pivotally mounted on the frame 2 and to its free end 136 is fastened a reject arm 138, the latter being spring urged by means of spring 140 in the direction of the arrow 142. The inner extremity 144 of the reject arm 138 is curved around the back of extension 98 of the latch means 92 so that if the switch 134 be pivoted in a clockwise direction as viewed in Fig. 2, the extremity 144 will engage the extremity 98 of the latch means 92 and move the latter to a position to release the initiating finger 76.

The operation of the initiating and velocity trip mechanism is as follows:

The tone arm during reproduction of the record moves inwardly thereover at a slow rate determined by the pitch of the grooves in the area 12 of the record 8, thus rotating shaft 50 and moving lift and sweep lever 44 so as to cause the cam follower 42 to move over the face of the three-dimensional cam surface of the cam wheel 40 and at the same time to cause the finger 122 to move toward the forked arm 114 of the forked member 112. As the inward motion of the tone arm 16 continues, the finger 122 makes contact with the forked arm 114 and rotates the forked member 112 slowly about the shaft 102, thus, via the frictional connection, rotating the cammed member 106 about the same shaft so as to urge the bumper 108 at its free extremity toward the cam 32. As this action continues, the bumper 108 is first moved in a short distance by the action of the finger 122 on the forked arm 114 and is then cammed out by engagement with the projection 32' on the cam 32. This slight reciprocation is imparted to the tripping means 124, its surface 130 thus idly sliding over the side of the extremity 98 of the latch means 92.

When the stylus 14 on the tone arm 16 passes from the area 12 of the record 8 into the spiral groove 20 of increased pitch, the tone arm 16 is swung more rapidly inward and therefore, via finger 122, forked arm 114 and the frictional connection, the cammed member 106 is rotated more rapidly so that, between successive camming out actions of the projection 32', the cammed member 106 is swung inwardly a greater amount than during normal reproduction. This amount is sufficient to permit the surface 130 of the tripping means 124 to slide past the extremity 98 of the latch means 92 so that the shoulder 132 can engage behind said extremity 98. Upon the next camming out action of the projection 32', the latch means 92 is positively moved so as to release the initiating finger 76 to its extended position where it engages with one of the separated teeth 30 of the second gear 28 so as to rotate the cam wheel 40 an amount sufficient to permit engagement between its peripheral gear 72 and the first gear 26. The cam wheel 40 will thus be rotated for one complete revolution until its mutilated portion 74 once again comes into registration with the first gear 26, at which time rotation of the cam wheel 40 will cease.

A projection 150 mounted on the bracket 38 projects upwardly into the path of the lug 82 on the tripping finger 76, so that as the cam wheel 40 rotates after the gears 26 and 72 have become engaged, the lug 150 will positively move the initiating finger 76 against the tension of the spring 80 to its withdrawn position. The inner extremity 88 of the finger 76 is so shaped that when the finger is thus moved, the latch means 92 will by it be moved against the tension of the spring 96 to permit the finger 76 to resume its withdrawn position, the latch means 92 snapping back behind the inner extremity 88 of the initiating finger 76 after it has assumed its withdrawn position to latch it in that position, reset until the next actuation of the initiating mechanism by the trip mechanism.

As the cam wheel 40 rotates, the cam follower 42 is moved by the three-dimensional cam surface both upwardly and outwardly so as to lift the tone arm 16 from the surface of the record 8 and move it outwardly to its record changing position, thus clearing the turntable for the changing of the record. When this occurs, the finger 122 makes contact with the forked arm 116 (see Fig. 2) thus moving the cammed member 106 to its outer position and slipping the frictional connection so as to reestablish the desired initial relationship between the cammed member 106 and the forked member 112, thus resetting the velocity trip mechanism in condition to be properly actuated by the next succeeding record reproduction.

The mechanism above described has proved itself to be simple and inexpensive to construct and assemble and at the same time to be reliable and efficient in operation. The tripping mechanism so cooperates with the initiating mechanism as to insure positive engagement of the two on rapid inward motion of the tone arm and prompt and positive action immediately thereafter to actuate the initiating mechanism so as to commence a record changing sequence.

The design of the various elements of this mechanism may of course be varied without departing from the spirit of the invention as defined in the following claims.

I claim:

1. A velocity trip for a phonograph comprising a turntable, a tone arm movable over a record thereon, a rotating cam, a cammed member frictionally connected to said tone arm and movable thereby toward and into contact with said cam as said tone arm moves inwardly over said record, said cam being effective to move said cammed member in the opposite direction, a normally stationary cam wheel provided wtih a mutilated section and effective when rotated to control a record changing sequence, rotating means for said cam wheel normally rotating within said mutilated section out of engagement with said cam wheel, initiating means comprising an element movably mounted on said cam wheel and, in one position, cooperable with said rotating means for moving said cam wheel into engagement with said rotating means, and latch means movably mounted on said cam wheel and, in one position, effective to hold said element out of cooperation with said rotating means, and tripping means effective to positively move said latch means from said one position to release said initiating means into cooperation with said rotating means, said tripping means being mounted on said cammed member and engageable with said latch means only on abnormal movement of said cammed member toward said cam when said tone arm is moved rapidly inward, said tripping means thereafter positively moving said latch means to release said initiating means when said cammed member is moved by said cam in said opposite direction.

2. The velocity trip of claim 1, in which said cammed member is pivotable about a shaft through one extremity thereof, the other extremity thereof being provided with a bumper for engaging said cam, said cammed member being moved to pivot about said shaft by a frictional connection including a forked member rotatable about said shaft and a friction disc between said forked member and said cammed member, said two members and said friction disc being spring urged into frictional contact, said forked member being moved to pivot about said shaft by means of a finger operatively connected to said tone arm and received inside the fork, the elements defining the fork being more widely spaced than the width of said finger, thereby providing for lost motion of said finger in said fork.

3. The velocity trip of claim 2, in which said cam wheel is provided with a three-dimensional cam surface for controlling the positioning of said tone arm during a record changing sequence, a cam follower cooperating with said three-dimensional cam surface to that end, a lift and sweep lever rigidly connected to said cam follower and effective to control the positioning of said tone arm, and said finger being mounted on said lever and receivable within the fork of said forked member and effective to move said forked member to pivot about said shaft.

4. A velocity trip for a phonograph comprising a turntable, a tone arm movable over a record thereon, a rotating cam, a cammed member frictionally connected to said tone arm and movable thereby toward said cam as said tone arm moves inwardly over said record, said cam being effective to move said cammed member in the opposite direction, a normally stationary cam wheel provided wtih a mutilated section and effective when rotated to control a record changing sequence, a hub rotating with said turntable, a first gear on said hub and rotating therewith for rotating said cam wheel, said first gear normally rotating within said mutilated section out of engagement with said cam wheel, a second gear on said hub and rotating therewith, an initiating finger movably mounted on said cam and spring urged toward a projecting position in which it is engageable wth said second gear so as to cause said cam wheel to move into engagement with said first gear, latch means pivotally mounted on said cam wheel and spring urged to a position in which it engages with said initiating finger and retains said finger out of its spring urged position, and a tripping lever effective to positively move said latch means to release said initiating finger, said tripping lever being movably mounted on said cammed member and spring urged toward and into contact with an extension on said latch means, said tripping lever sliding ineffectually back and forth on said extension as said cammed member is moved inwardly a small amount by said tone arm and cammed outwardly a small amount by said cam while said tone arm moves normally inward over said record, said tripping lever being engageable behind said extension when said tone arm moves inwardly an abnormal amount and said cammed member is moved inwardly an abnormal amount thereby, said tripping lever thereafter positively moving said latch means to release said initiating finger when said cammed member is moved by said cam in said opposite direction.

5. The velocity trip of claim 4, in which said cammed member is pivotable about a shaft through one extremity thereof, the other extremity thereof being provided with a bumper for engaging said cam, said cammed member being moved to pivot about said shaft by a frictional connection including a forked member rotatable about said shaft and a friction disc between said forked member and said cammed member, said two members and said friction disc being spring urged into frictional contact, said forked member being moved to pivot about said shaft by means of a finger operatively connected to said tone arm.

6. The velocity trip of claim 5, in which said cam wheel is provided with a three-dimensional cam surface for controlling the positioning of said tone arm during a record changing sequence, a cam follower cooperating with said three-dimensional cam surface to that end, a lift and sweep lever rigidly connected to said cam follower and effective to control the positioning of said tone arm, and said finger being mounted on said lever and receivable within the fork of said forked member and effective to move said forked member to pivot about said shaft.

7. A velocity trip for a phonograph comprising a turntable, a tone arm movable over a record thereon, a hub rotating with said turntable, a cam on said hub and rotating therewith, a cammed member frictionally connected to said tone arm and movable thereby toward said cam as said tone arm moves over said record, said cam being effective to move said cammed member in the opposite direction, a normally stationary cam wheel provided with a mutilated section and effective when rotated to control a record changing sequence, a first gear on said hub below said cam and rotating therewith for rotating said cam wheel, said gear normally rotating within said mutilated section out of engagement with said cam wheel, a second gear positioned below said first gear and rotating therewith, an initiating finger pivotally mounted on the underside of said cam and spring urged toward a projecting position in which it is engageable with said second gear so as to cause said cam wheel to move into engagement with said first gear, latch means pivotally mounted on the underside of said cam wheel and spring urged to a position in which it engages with said initiating finger and retains said finger out of its spring urged position, and a tripping lever effective to positively move said latch means to release said initiating finger, said tripping lever being pivotally mounted on said cammed member and spring urged toward and into contact with an extension on said latch means extending upwardly through said cam wheel, said tripping lever sliding ineffectually back and forth on said extension as said cammed member is moved inwardly a small amount by said tone arm and cammed outwardly a small amount by said cam while said tone arm moves normally inward over said record, said tripping lever being engageable behind said extension when said tone arm moves inwardly an abnormal amount and said cammed member is moved inwardly an abnormal amount thereby, said tripping lever thereafter positively moving said latch means to release said initiating finger when said cammed member is subsequently moved by said cam in said opposite direction.

8. The velocity trip of claim 7, in which said cammed member is pivotable about a shaft through one extremity thereof, the other extremity thereof being provided with a bumper for engaging said cam, said cammed member being moved to pivot about said shaft by a frictional connection including a forked member rotatable about said shaft and a friction disc between said forked member and said cammed member, said two members and said friction disc being spring urged into frictional contact, said forked member being moved to pivot about said shaft by means of a finger operatively connected to said tone arm.

9. The velocity trip of claim 8, in which said cam wheel is provided with a three-dimensional cam surface for controlling the positioning of said tone arm during a record changing sequence, a cam follower cooperating with said three-dimensional cam surface to that end, a lift and sweep lever rigidly connected to said cam follower and effective to control the positioning of said tone arm, and said finger being mounted on said lever and receivable within the fork of said forked member and effective to move said forked member to pivot about said shaft.

JOHN S. HALL.

REFERENCES CITED

The following references are of record in the file of this patent:

UNITED STATES PATENTS

| Number | Name | Date |
|---|---|---|
| 2,280,685 | Carson | Apr. 21, 1942 |
| 2,298,988 | Todd | Oct. 13, 1942 |
| 2,330,293 | Knox | Sept. 28, 1943 |
| 2,371,362 | Small | Mar. 13, 1945 |